(12) United States Patent
Laycock

(10) Patent No.: US 6,309,286 B1
(45) Date of Patent: Oct. 30, 2001

(54) GRINDING MACHINE AND METHOD OF GRINDING

(75) Inventor: Michael Laycock, Cross Hills-Keighley (GB)

(73) Assignee: Unova U K Ltd. (GB)

( * ) Notice: Subject to any disclaimer, the term of this patent is extended or adjusted under 35 U.S.C. 154(b) by 0 days.

(21) Appl. No.: 09/320,129

(22) Filed: May 25, 1999

Related U.S. Application Data

(62) Division of application No. 08/737,974, filed on Feb. 6, 1997, now Pat. No. 6,145,419.

(30) Foreign Application Priority Data

May 27, 1994 (GB) .................................................. 9410682
Nov. 30, 1994 (GB) .................................................. 9424139

(51) Int. Cl.$^7$ ................................. B24B 5/00; B24B 5/18
(52) U.S. Cl. ............................................. 451/242; 451/251
(58) Field of Search .................................. 451/5, 11, 242, 451/243, 251, 399, 364, 397, 398, 365; 279/16; 82/65, 170, 168; 464/173

(56) References Cited

U.S. PATENT DOCUMENTS

| | | | |
|---|---|---|---|
| 4,885,874 | * 12/1989 | Wedeniwski | 451/11 |
| 5,101,601 | * 4/1992 | Funnell | 451/28 |
| 5,616,070 | * 4/1997 | Rice et al. | 451/251 |
| 6,038,489 | * 3/2000 | Pickles et al. | 700/164 |

FOREIGN PATENT DOCUMENTS

846517 * 6/1998 (EP) .

* cited by examiner

*Primary Examiner*—Derris H. Banks
(74) *Attorney, Agent, or Firm*—Morris I. Pollack

(57) ABSTRACT

An apparatus for, and method of, grinding crankpins of a crankshaft wherein the machine is under computer control and the grinding wheel is advanced and retracted under computer control so as to follow the planetary motion of the crankpin as the crankshaft rotates. This maintains grinding contact between the wheel and the crankpin to allow the grinding of the latter. The crankshaft is mounted between centers and is rotated by a drive unit, drive being transmitted to the end of the crankshaft via a connecting device which is torsionally rigid in a plane perpendicular to the axis of rotation of the crankshaft but which is readily deformable in other planes to accommodate misalingnment and so as to decouple the crankshaft from the drive other than to transmit pure rotation to the crankshaft.

25 Claims, 6 Drawing Sheets

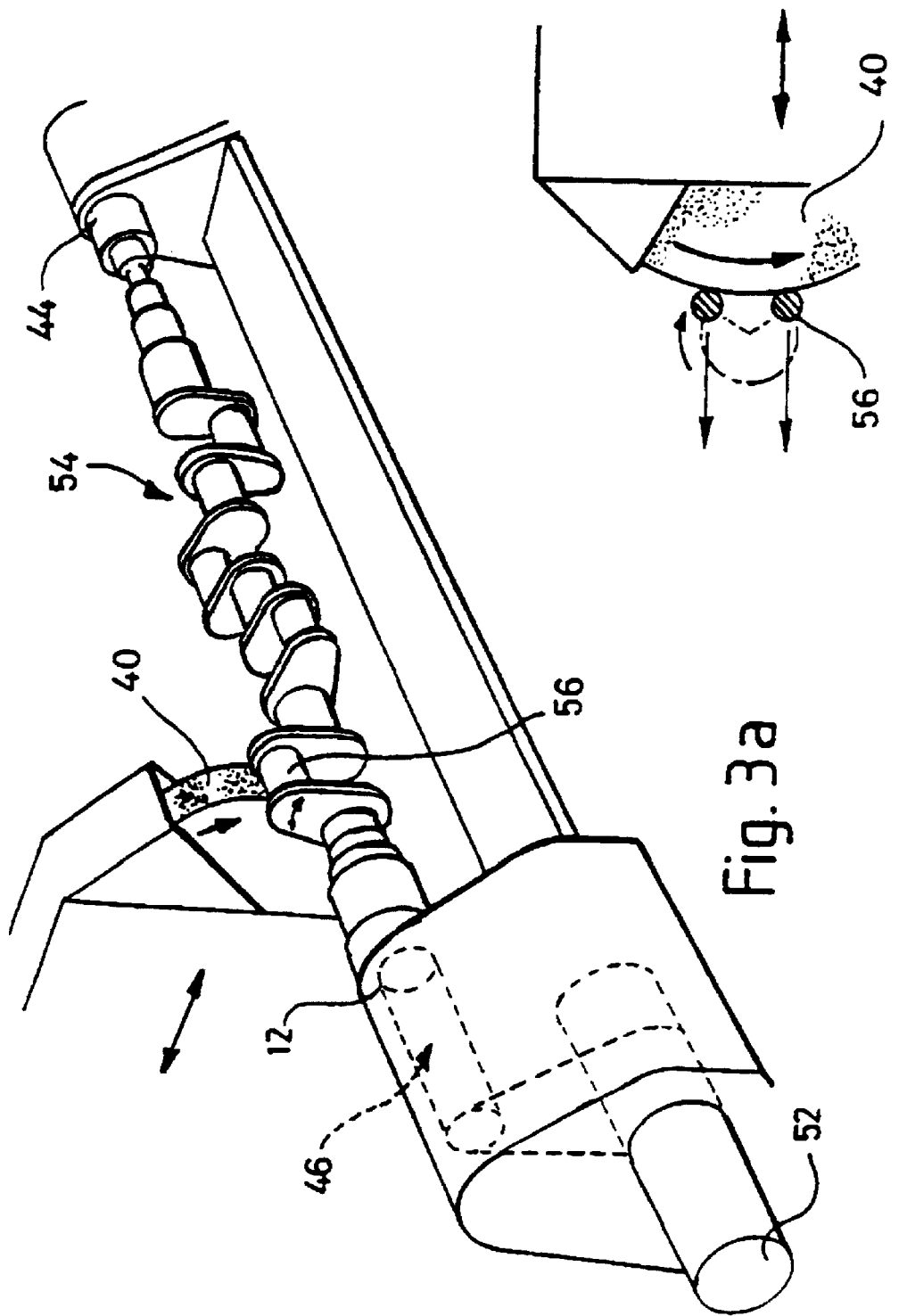

GRINDING MACHINE AND METHOD OF GRINDING

CROSS-REFERENCE TO RELATED APPLICATIONS

This application is a Division of application U.S. Ser. No. 08/737,974, filed on Feb. 6, 19997 now U.S. Pat. No. 6,145,419.

FIELD OF INVENTION

This invention relates to grinding machine.

BACKGROUND TO THE INVENTION

When machining articles to a desired shape it is often necessary to rotate the article (usually termed the workpiece) so that symmetrical machining can be achieved of a given cross section.

Rotation of the workpiece to be machined can be achieved by securing the workpiece into a rotating chuck. However if the workpiece is not centralised correctly within the clamaping jaws of the chuck, it will not rotate in a 'true' fashion and machining will be inaccurate.

Alternative methods of transmitting rotation involve the use of a tailstock and a headstock to support the article between centers, the headstock transmitting the rotation, directly or indirectly to the workpiece.

The interengagement between the workpiece and the headstock or driver may be subject to misalignment and offset, which will introduce errors in the machining.

An improved drive transmitting device which will not transmit misalignment or offset to the workpiece is described in U.S. patent application Ser. No. 08/737,974.

SUMMARY OF THE INVENTION

The invention lies in a method of grinding a crankpin of a crankshaft which latter includes a circular flange at one end, comprising the steps of:

mounting the crankshaft between centers;

attaching radially outer regions of the flange to a rotational drive to rotate the crankshaft about its main axis, via a coupling which is torsionally rigid in a plane generally perpendicular to the axis of rotation of the crankshaft but which is readily deformable in other planes to accommodate misalignment;

advancing the grinding wheel to engage a crankpin region of the crankshaft, and synchronously controlling the position of the grinding wheel whilst the crankshaft is rotated thereby to follow the planetary motion of the crankpin so as to maintain grinding contact between the wheel and the pin.

The advancement and retraction of the grinding wheel is preferably under the control of a computer. In a method as aforesaid, the crankshaft is preferably mounted between headstock and tailstock centres for rotation about its main axis.

The invention also lies in a machine tool (grinding machine) for machining a crankshaft workpiece wherein drive of the latter is provided by means of at least one drive decoupling means, substantially as described in U.S. patent application Ser. No. 08/737,974.

The invention thus provides a grinding machine which is adapted to grind a crankpin region of a crankshaft by synchronously advancing and retracting the grinding wheel as the crankshaft is rotated so the contact is maintained between grinding wheel and crankpin during grinding so as to grind a true cylindrical surface on the crankpin, which includes drive means for rotating the crankshaft, and a coupling means which is torsionally rigid in a plane generally perpendicular to the axis of the crankshaft but is readily deformable in other planes to accommodate misalignment, for correcting the drive means to the crankshaft.

Preferably the drive coupling means a driving member and a driven member which is attachable to the crankshaft so as to rotate the latter and a connecting means for transferring torque the driving and driven members; which comprises a laminated device attached to the driving member via at least one off axis connection and to the driven member by at least one other off axis connection, the connections being circularly spaced one from the other.

In one embodiment the laminations are formed from flexible thin sheet steel, so that the connecting means is torsionally rigid in a plane perpendicular to the drive axis so as to ensure rotation is transmitted reliably to the driven member, and the flexibility of the laminations accommodates any eccentricity developed through misalignment of the driving member and driven member.

In this way the driven member and therefore the workpiece is decoupled from the driving member.

Where the crankshaft and is to be mounted between a headstock and of the grinding machine, the components of the drive decoupling means may be centrally apertured to accommodate the headstock, which can thereby extend axially therethrough to engage one end of the crankshaft.

Preferably the driven member may be provided with radially adjustable means for securing it to the load.

Preferably the securing means is arranged symmetrically and allows centering of the member relative to the crankshaft.

The adjustment may be provided by pneumatic, electrical or hydraulic means so that release and removal of a crankshaft can be performed automatically.

In a particularly preferred embodiment, two drive decoupling means as aforesaid are connected in series, the driven member of the first being connected to the driving member of the second. Such an arrangement allows even greater decoupling to be achieved than if only a single drive decoupling means is employed and permits offset as well as misalignment to be accommodated.

The invention is of value in that it permits an NCR grinding machine to be used to cylindrically grind off-axis crankpins of a crankshaft by synchronously advancing and retracting the grinding wheel as the crankshaft is rotated.

Thus the invention provides a method of grinding a crankpin of a crankshaft mounted for rotation between centres and driven during the grinding process so as to rotate true about its main axis, wherein a rotating grinding wheel is advanced and retracted under computer control in synchronism with the planetary rotation of the crankpin caused by the rotation of the crankshaft so as to maintain grinding contact between the wheel and the pin at all times during the grinding of the pin.

After grinding a crankpin to a desired diameter, the grinding wheel may be retracted and moved axially so as to register with another crankpin on the crankshaft, to enable the latter to be ground.

A grinding machine embodying the invention thus comprises a headstock and tailstock between which a crankshaft can be mounted for true rotation between centres, means for driving the crankshaft, and means for coupling the drive means thereto in a manner so as to remove errors due to offset and misalignment, a grinding wheel which can be advanced and retracted towards and away from a crankshaft when the latter is mounted in the machine and aligned with a crankpin thereof, and a computer for controlling the said advance retraction of the wheel thereby, so as to maintain grinding contact between the wheel and the pin al all times during the grinding of the pin.

The invention will now be described by way of example with reference to the accompanying drawings in which:

FIG. 3(a) is a perspective view of the drive decoupling means as applied to grinding crankpins FIG. 3(b) is a section through the grinding wheel and crankpin as shown in FIG. 3(a)

Figure 6:
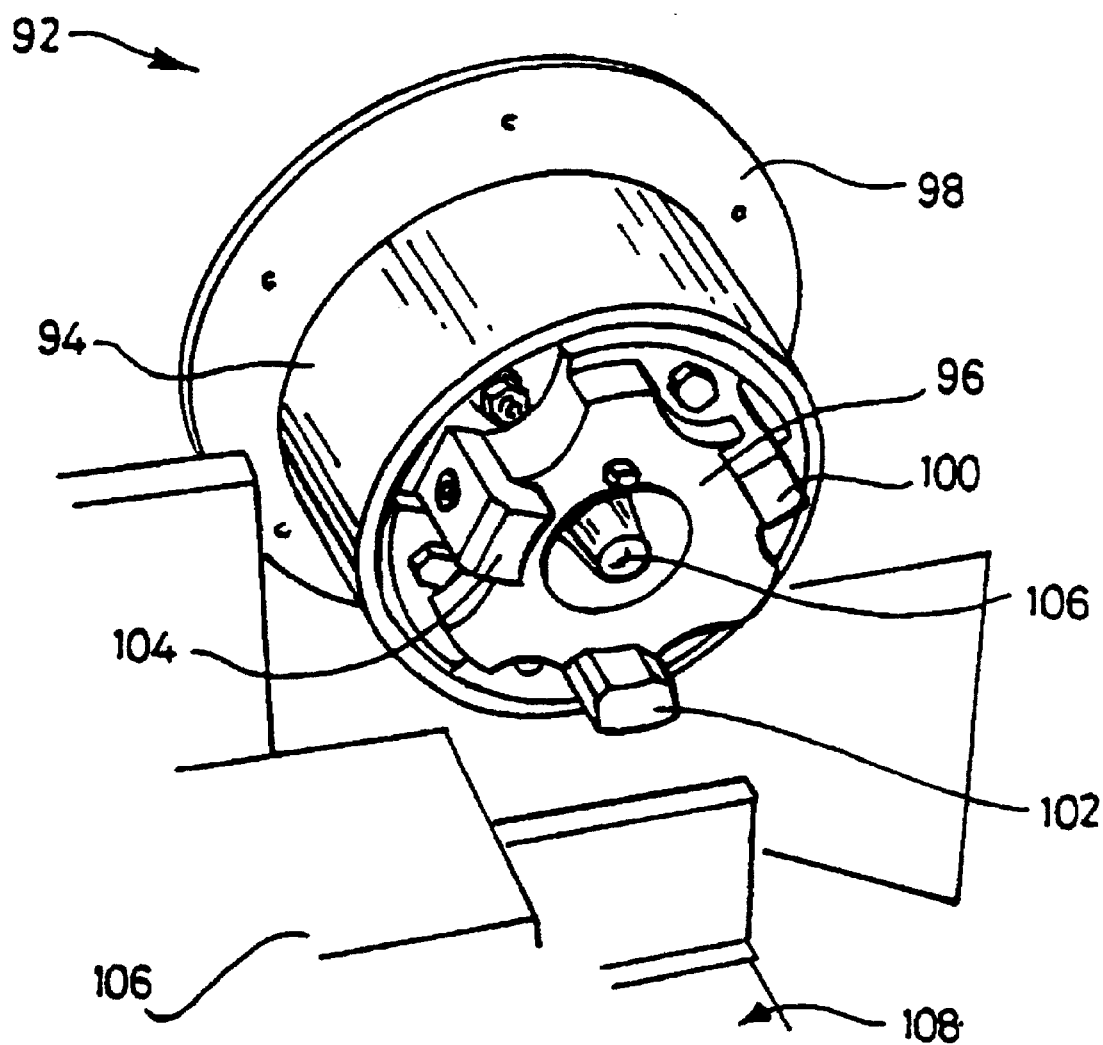
Figure 7:
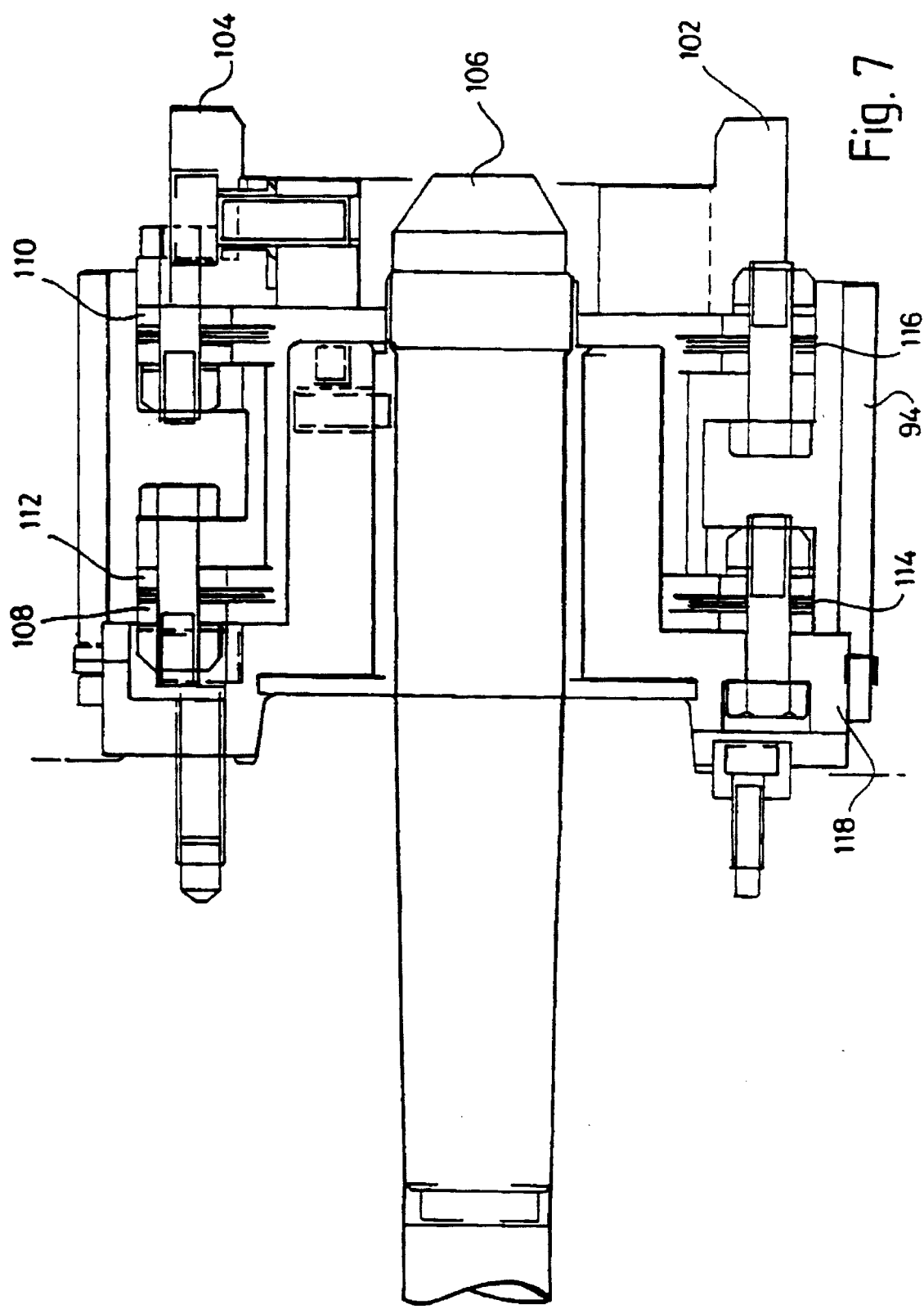

FIG. 6 in a view of a part of a grinding machine with a housing encasing a drive decoupling device, and FIG. 7 is a vertical section through the grinding machine housing as shown in FIG. 6.

DETAILED DESCRIPTION OF EMBODIMENTS

Figure 1:
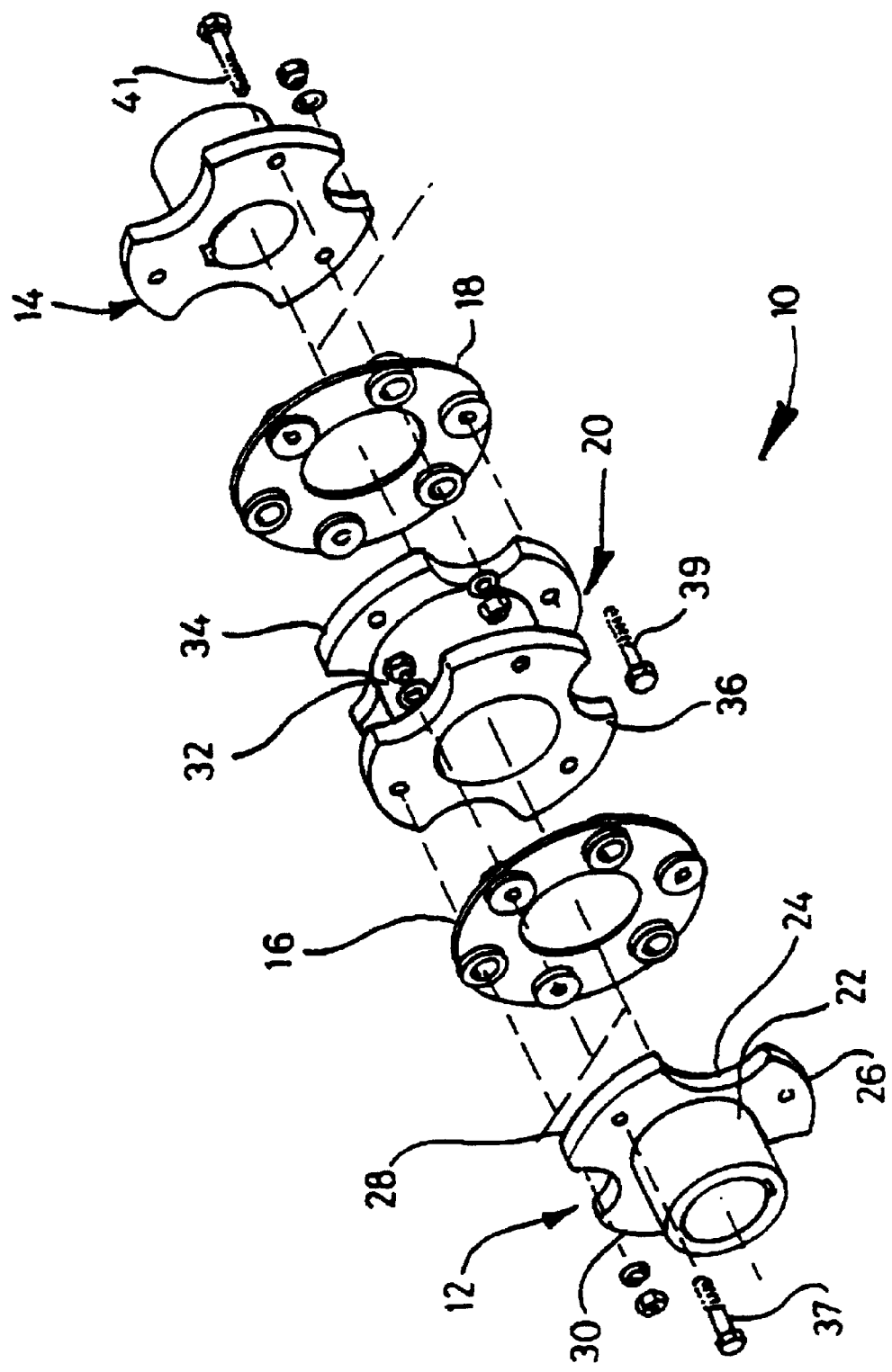
FIG. 1 is an exploded view of a prior art flexible coupling

Referring to FIG. 1, a flexible coupling device 10 is shown. The coupling device 10 is shown exploded to illustrate the separate components.

The coupling device 10 comprises two identical connecting members 12, 14, two laminated discs 16, 18 each formed from a stack of thin sheet steel rings typically formed from shim steel, and a coupling sleeve 20, all the aforesaid being centrally apertured so as to allow a headstock to extend therethrough.

The connecting member 12 further comprises a cylindrical hub 22, and a circular flange 24 which is cutaway at three circumferentially equally spaced positions. The three resulting lobes 26, 28, 30 are apertured.

The second connecting member 14 is similar in construction.

The coupling sleeve 20 comprises a central cylindrical portion 32 with annular flanges 34, 36 at either end. The flanges 34, 36 are circumferentially cut away to leave lobes in a similar manner as in the flange 24.

In use, the coupling device 10 is assembled so that the connecting members 12, 14 and coup ling sleeve 20 are interconnected by the laminated discs of thin shim steel rings 16, 18.

The lobes of the flange 36 of the coupling sleeve 20 are connected to the disc 16 by three hexagon bolts, one of which is shown at 37. Three spaced apertures of the disc 16 are connected to the flange 36.

Similar bolts join the three lobes 26, 28 and 30 of member 12 to the disc 16 at points intermediate the bolts 37.

The second connecting disc 18 is similarly connected to the lobes of the flange 34 by means of three bolts one of which is shown at 39 and similarly to the lobes of the flange 14 by similar bolts one of which is shown at 41.

The members 12, 14 are thus connected to the coupling sleeve 20 through the laminations of the discs 16, 18.

Thus an assembly the interconnection of the individual connecting members 12, 14 and coupling sleeve 20 by use of the flexible laminated thin sheet steel discs 16, 18 ensures a torsionally rigid coupling which may be used in a machine tool to transmit drive to a workpiece. The flexibility of the discs 16, 18 absorbs any misalignment or axial offset of the drive member and workpiece relative to each other.

Figure 2A:
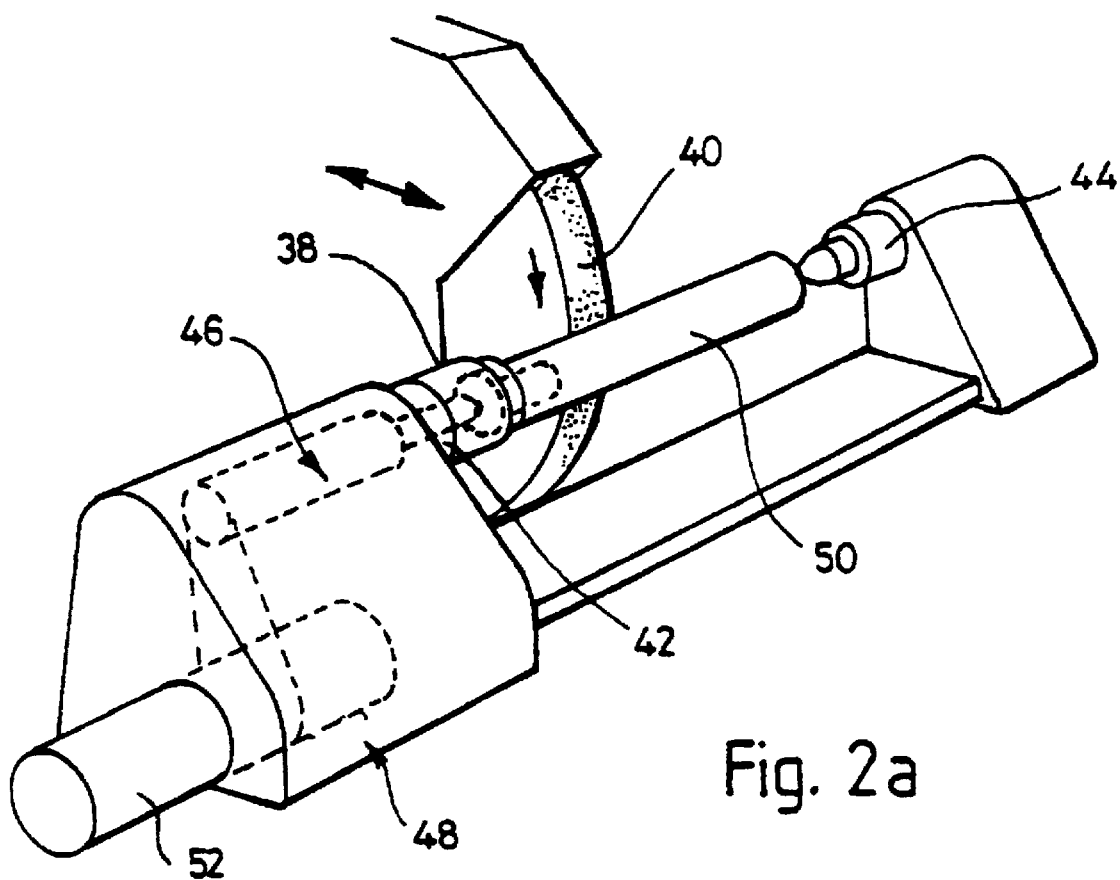
FIG. 2(a) is a perspective view of a drive decoupling means as applied to a grinding machine

Part of a grinding machine is shown in FIG. 2(a) Here a coupling device such as shown in FIG. 1 is encased within a housing 38.

The grinding machine comprises a grinding wheel 40, a headstock 42, a tailstock 44 and drive means 46 contained within a housing 48.

The headstock 42 is free to pass through the centre of the coupling device 10 contained within the housing 38. The headstock 42 and tailstock 44 support a workpiece 50.

The coupling device 10 is connected at one end to the driving means 46 and at the other end is detachably secured to the workpiece 50.

Rotation of the drive means 46 by the motor 52 rotates the coupling device 10. The workpiece 50 is supported between the headstock 42 and tailstock 44 and is rotated by rotation of the coupling device 10 by the motor 52.

The decoupling of the workpiece 50 from the drive means 46 by the coupling device 10 removes errors due to misalignment and offset of the drive means 46 relative to the workpiece 50.

Figure 2B:
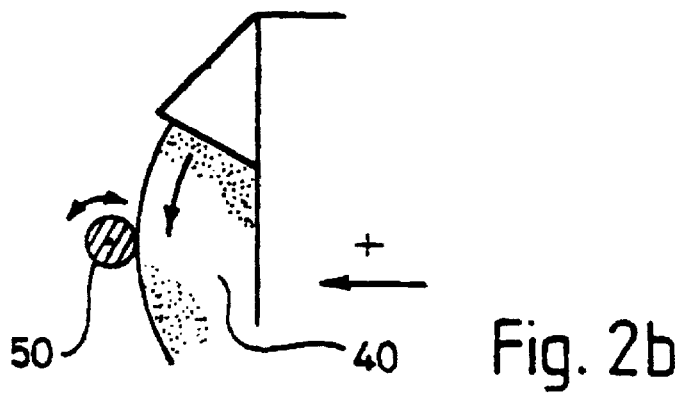
FIG. 2(b) is a sectional view through the grinding wheel and workpiece as shown in FIG. 2(a)

FIG. 2(b) shows the grinding wheel 40 and workpiece 50 during a grinding operation. The grinding wheel 40 contacts the workpiece 50 and grinds the surface to a desired diameter.

FIG. 3(a) shows how a grinding machine can be used cylindrically grind off-axis crankpins of a crankshaft 54.

The crankshaft is supported between the headstock 42 and tailstock 44, and includes a number of crankpins one of which is denoted by reference numeral 56.

The drive means 46 rotates the crankshaft 54 via the coupling device 10 as discussed in relation to FIG. 2(a).

Rotation of the crankshaft 54 results in each off axis crankpin describing a circle centered on the crankshaft axis as shown in FIG. 3(b).

The grinding wheel 40 synchronously advances and retracts as the crankshaft 54 rotates and the crankpin 56 describes a circle, this advance and retraction is controlled so that the grinding wheel 40 maintains contact with the crankpin surface at all times during the rotation of the crankshaft 54, thereby grinding a true cylindrical surface on the crankpin 56. Although not shown the operation of the grinding machine is controlled by a computer.

As each crankpin is ground to the desired diameter, the grinding wheel 40 is retracted and moved axially along the crankshaft 54 to register with another crankpin. In this way an entire crankshaft can be ground automatically.

Attachment of the coupling device 10 to crankshaft 54 is preferably achieved by a clamping ring as shown in FIGS. 4(a) and 4(b) and 5(a) and 5(b).

Figure 4A:
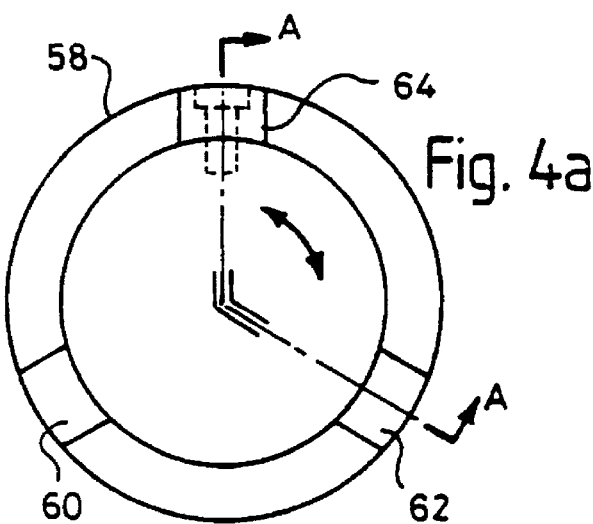
FIG. 4(a) is an end view a clamping ring for clamping a workpiece to the drive decoupling means

In FIG. 4(a) a clamping ring 58 is shown having two fixed jaws 60, 62 and an adjustable jaw 64.

Figure 4B:
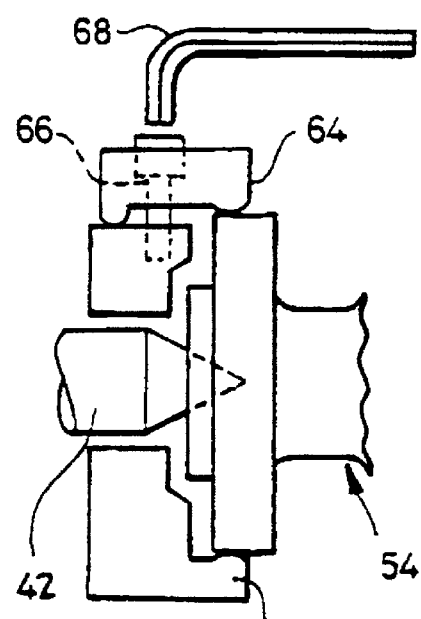
FIG. 4(b) is a section (not to scale) along line A—A of FIG. 4(a).

FIG. 4(b) is a section (not to scale) along line A—A of FIG. 4(a).

In use the crankshaft 54, is inserted between the three jaws 60, 62, 64 and the adjustable jaw 64 is tightened onto the crankshaft 54 by means of a threaded thrust member 66 such as a screw. Adjustment of the threaded member 66 may be by way of by an Allen key spanner 68 so as to cause the jaw 64 to grip the crank 54 against the two fixed jaws 60, 62.

Loosening the threaded member 66 allows removal of the crankshaft 54.

The headstock 42 passes through the central aperture to contact the crankshaft 54 for support.

Figure 5A:
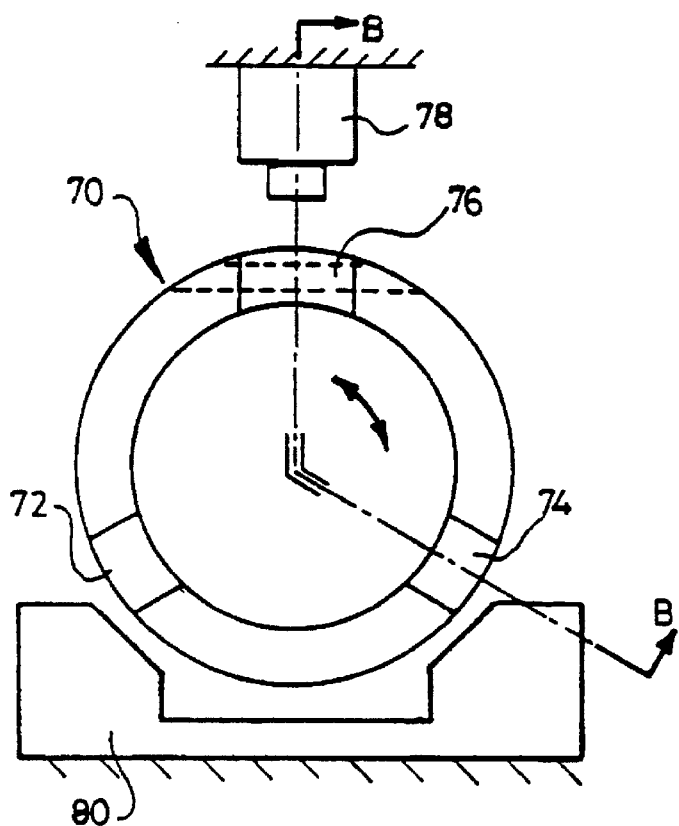
FIG. 5(a) is an end view of a preferred embodiment for clamping a workpiece within the drive decoupling means
Figure 5B:
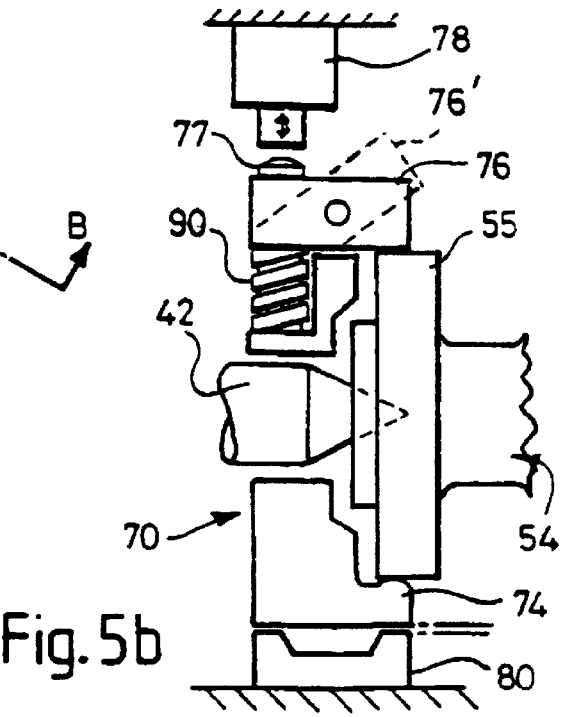
FIG. 5(b) is a section (not to scale) along line B—B of FIG. 5(a) and illustrates an adjustable jaw in more detail.

An alternative clamping device 70 is shown in FIGS. 5(a) and 5(b).

FIG. 5(a) shows a clamping ring 70 having as before two fixed jaws 72, 74 and an adjustable jaw 76. A hydraulic piston and cylinder 78 is provided to facilitate insertion and removal.

FIG. 5(b) is a section (not to scale) along line B—B of FIG. 5(a) and illustrates the adjustable jaw 76 in more detail.

In the clamped position a flange 55 of the crankshaft is held between the adjustable jaw 76 and the fixed jaws 72, 74. The spring 90 acts to urge the adjustable jaw 76 against the flange 55.

As before the headstock 42 passes through central apertures in the drive coupling device 10 and clamping ring 70 to support the crankshaft 54.

To release the crankshaft 54, the hydraulic cylinder 78 is actuated to push down on touch pad 77.

The spring 90 is sufficiently strong as to initially resist this downward force, which is thus transmitted to the ring 70 and the latter displaces downwards until it hits bed 80. Thereafter continued movement of the piston in the cylinder 78 results in compression of the spring 90 and pivoting of the jaw 76 into the position shown at 76', so all three jaws 72, 74, 76 are now clear of the flange 55.

The crankshaft 54 is now clear and can be removed from the jaws 72, 74, 76.

The bed 80 is spaced by a running clearance from the clamping ring 70.

The interaction of the flange 55, the bed 80 and the spring 90 ensures that all three jaws 72, 74, 76 are moved clear of the flange 55.

FIG. 6 shows a view of a grinding machine housing 92 containing a drive means for operating the grinding machine, with a housing 94 attached, to encase a drive decoupling device such as is shown in FIG. 1.

The housing 94 encases the drive decoupling device except for a drive plate 96 and jaws 100, 102, 104. An annular attachment 98 fits over the housing 94 and attaches to the grinding machine drive housing 92. This ensures that no gap is left between the housing 94 and the housing 92 so as to improve safety and reduce the entry of dirt and swarf during machining.

Jaws 100, 102, 104 are provided for clamping a workpiece. An adjustable jaw 104 grips the workpiece against the two fixed jaws 100, 102. Rotation of the drive plate 96 by the drive means, contained within the housing 92, causes rotation of the flanged crankshafts. A headstock 106 passes through the central aperture of the coupling device so as to allow for support of the crankshaft during machining. The control panel 106 and bed of the machine 108 are shown.

As shown in FIG. 7 the headstock 106 passes through the central aperture of the coupling device. The latter comprises connecting members 108, 110 and a coupling sleeve 112 which are interconnected by laminated discs in the form of thin shim-steel rings 114, 116. The coupling device is connected at one end to the driving means and at the other end is detachably securable to the flange of the crankshaft by means of the jaws 100, 102, 104 (only 102, 104 of which are visible in FIG. 7). A faceplate 118 is shown surrounding the headstock 106, with the cover 94 enclosing the entire coupling device shown.

What is claimed is:

1. A grinding machine adapted to grind a crankpin region of a crankshaft by synchronously advancing and retracting a grinding wheel as the crankshaft is rotated so that contact is maintained between the grinding wheel and crankpin during grinding of the crankpin so as to grind a true cylindrical surface on the crankpin, comprising drive means for rotating the crankshaft, and a drive coupling means which is torsionally rigid in a plane generally perpendicular to the axis of the crankshaft but is readily deformable in other planes to accommodate misalignment for connecting the drive means to the crankshaft.

2. A grinding machine as claimed in claim 1 which includes a headstock and a tailstock and wherein the drive coupling means includes components that are centrally apertured to enable the headstock to extend axially therethrough, to engage one end of the crankshaft.

3. A grinding machine as claimed in claim 1 wherein the drive coupling means comprises a drive member, and a driven member which is attachable to the crankshaft so as to rotate the latter and a connecting means for transferring torque between the drive and driven members which comprises a laminated device attached to the drive member via at least one off axis connection and to the driven member by at least one other off axis connection, the connections being circularly spaced one for the other.

4. A grinding machine as claimed in claim 3 which includes a headstock and a tailstock and wherein the drive coupling means includes components which are centrally apertured to enable the headstock to extend axially therethrough, to engage one end of the crankshaft.

5. A grinding machine as claimed in claim 3 wherein the driven member is provided with radially adjustable means for securing the driven member to the crankshaft.

6. A grinding machine as claimed in claim 3 wherein two drive coupling means are connected in series, the driven member of the first being connected to the drive member of the second, whereby offset as well as misalignment can be accommodated.

7. A grinding machine claimed in claim 3 wherein the laminated device includes laminations formed from flexible thin sheet steel so that the connecting mean is torsionally rigid in a plane perpendicular to the drive axis so as to ensure rotation is transmitted reliably to the driven member, and the flexibility of the laminations accommodates any eccentricity developed through misalignment of the drive member and driven member, whereby the driven member and therefore the crankshaft is decoupled from the drive member.

8. A grinding machine as claimed in claim 7 wherein the driven member is provided with radially adjustable means for securing the driven members to the crankshaft.

9. A grinding machine as claimed in claim 7 wherein two drive coupling means are connected in series, the driven member of the first being connected to the drive member of the second, whereby offset as well as misalignment can be accommodated.

10. A grinding machine as claimed in claim 7 which includes a headstock and a tailstock and wherein the drive coupling means includes components which are centrally apertured to enable the headstock to extend axially there through, to engage one end of the crankshaft.

11. A grinding machine as claimed in claim 10 wherein two drive coupling means are connected in series, the driven member of the first being connected to the drive member of the second, whereby offset as well as misalignment can be accommodated.

12. A grinding machine as claimed in claim 10 wherein the driven member is provided with radially adjustable screwing means for securing it to the crankshaft.

13. A grinding machine as claimed in claim 12 wherein two drive coupling means are connected in series, the driven member of the first being connected to the drive member of the second, whereby offset as well as misalignment can be accommodated.

14. A grinding machine as claimed in claim 12 wherein the adjustment is effected by pneumatic, electrical or hydraulic means.

15. A grinding machine as claimed in claim 12 wherein the securing means is arranged symmetrically to allow centering of the driven member relative to the crankshaft.

16. A grinding machine as claimed in claim 15 wherein two drive coupling means are connected in series, the driven member of the first being connected to the drive member of the second, whereby offset as well as misalignment can be accommodated.

17. A grinding machine as claimed in claim 15 wherein the adjustment is effected by pneumatic, electrical or hydraulic means.

18. A grinding machine as claimed in claim 17 wherein two drive coupling means are connected in series, the driven member of the first being connected to the drive member of the second, whereby offset as well as misalignment can be accommodated.

19. A grinding machine as claimed in any of claims 2 to 18 further comprising a computer adapted to control and synchronize advancing and retracting of the grinding wheel as the crankshaft is rotated.

20. A grinding machine comprising a headstock and tailstock between which a crankshaft can be mounted for rotation between centres, means for drive the crankshaft and means for coupling the drive means thereto in a manner as to remove errors due to offset and misalignment, a grinding wheel which can be advanced and retracted towards and away from a crankshaft, when the latter is mounted in the grinding machine, and aligned with a crankpin thereof, and a computer for controlling the said advance and retraction of the grinding wheel thereby to cause the latter to advance and retract in synchronism with the planetary motion of the crankpin as the crankshaft rotates, so as to maintain grinding contact between the grinding wheel and the crankpin at all time during the grinding of the crankpin.

21. A method of grinding a crankpin of a crankshaft by a synchronously controlled grinding wheel while the crankshaft is mounted between centers, the crankshaft having a main axis of rotation and including a circular flange at one end, comprising the steps of:

(a.) providing a rotational drive;

(b.) providing a coupling that is torsionally rigid in a predetermined plane but which is readily deformable in other planes to accommodate misalignmemt;

(c.) mounting the crankshaft between the centers;

(d.) attaching radially outer regions of the circular flange to said rotational drive to rotate the crankshaft about the main axis of rotation through said coupling and so that said predetermined plane is perpendicular to the main axis of rotation of the crankshaft;

(e.) advancing the grinding wheel to engage a crankpin of the crankshaft; and (f.) synchronously controlling the position of the grinding wheel while the crankshaft is rotated to follow the planetary motion of the crankpin so as to maintain grinding contact between the grinding wheel and the crankpin.

22. A method as claimed in claim 21 including providing a computer and advancing and retracting the grinding wheel under computer controls.

23. A method as claimed in claim 22 wherein the centers are respectively provided on a headstock and tailstock.

24. A method of grinding a crankpin with a crankpin axis radially offset from but substantially parallel to a main axis of a crankshaft, the crankshaft being mounted for rotation between centers and being driven through a coupling mechanism that removes errors due to offset and misalignment during the grinding process and so as to rotate about the main axis of the crankshaft, wherein a rotating grinding wheel is advanced and retracted, under computer control and in synchronism with planetary rotation of the crankpin to be ground caused by rotation of the crankshaft, so as to maintain grinding contact between the grinding wheel and the crankpin at all times during grinding of the crankpin.

25. A method as claimed in claim 24, wherein as each crankpin is ground to the desired diameter, the grinding wheel is retracted and moved axially to register with another crankpin on the crankshaft to enable the latter to be ground.

* * * * *